Feb. 20, 1945.  G. J. SHELDON  2,369,758
METHOD OF MANUFACTURING CONTACT LENSES
Filed Feb. 3, 1941  2 Sheets-Sheet 1
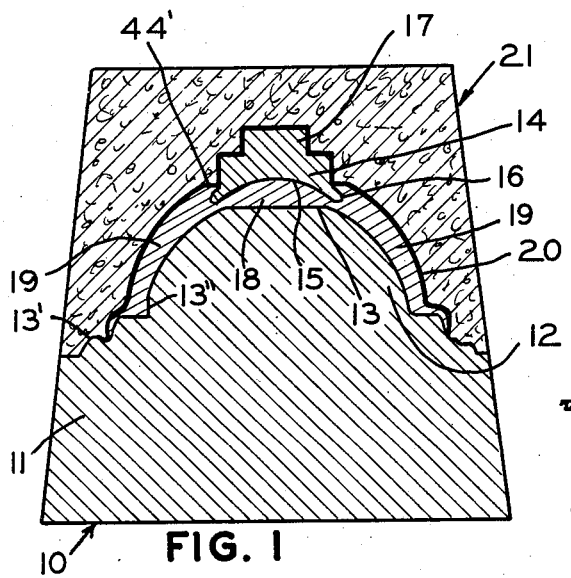
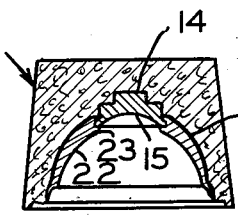
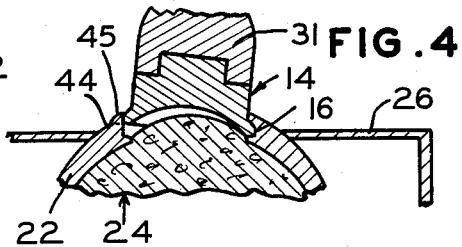
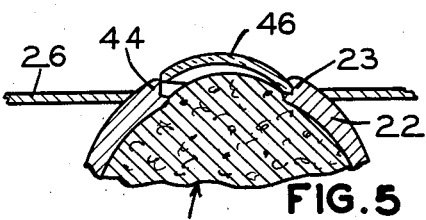
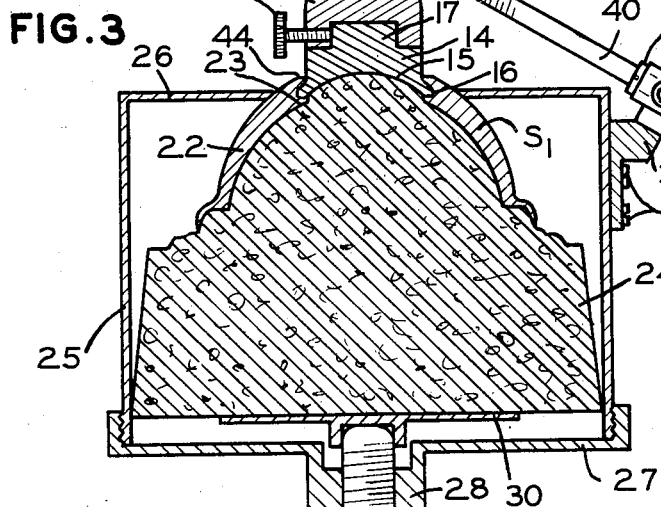
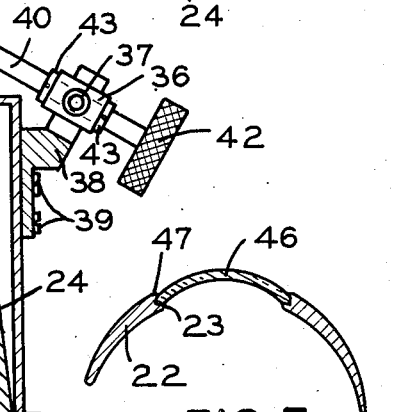
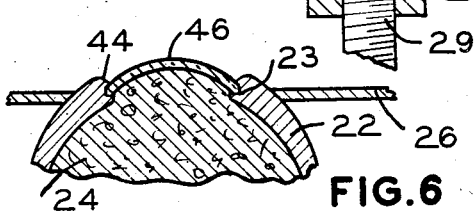
GILBERT J. SHELDON
INVENTOR
BY
ATTORNEYS Feb. 20, 1945. G. J. SHELDON 2,369,758
METHOD OF MANUFACTURING CONTACT LENSES
Filed Feb. 3, 1941  2 Sheets-Sheet 2
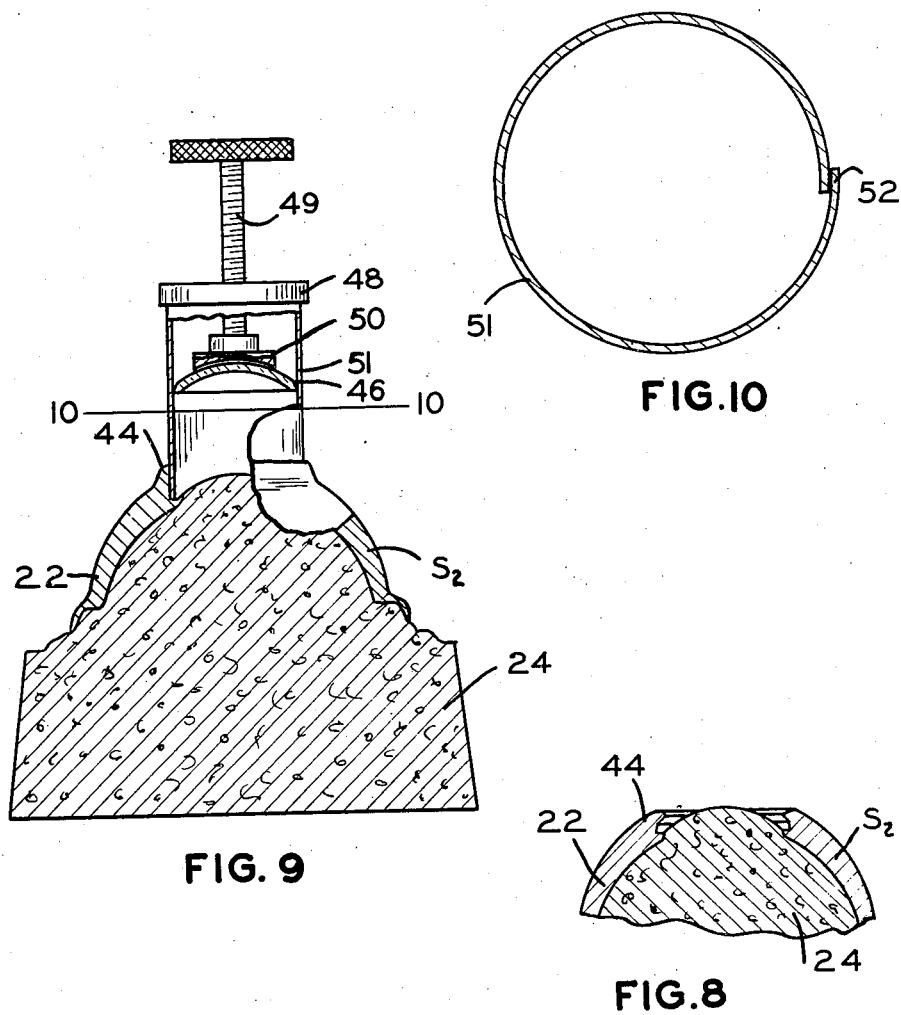
GILBERT J. SHELDON
INVENTOR
BY
ATTORNEYS Patented Feb. 20, 1945

2,369,758

UNITED STATES PATENT OFFICE 2,369,758

METHOD OF MANUFACTURING CONTACT LENSES

Gilbert J. Sheldon, Irondequoit, N. Y., assignor to Bausch & Lomb Optical Company, Rochester, N. Y., a corporation of New York Application February 3, 1941, Serial No. 377,188

8 Claims. (Cl. 18—47.5)

The invention relates to contact lenses and more particularly is concerned with a process for producing lenses of that type.

Contact lenses are formed of two elements, namely, a scleral rim or band and a corneal lens. Each element is shaped to the particular curvature necessary to fit the requirements of an individual user. Curvatures possessed by the human sclera are relatively few in number. In fact, the scleral curve of the average eye will fall within a range of approximately thirty different curvatures. On the other hand, the possible different errors in refraction of the eye are unlimited so that an infinite number of corneal curves are needed to correct for all of them. Due to these conditions the impracticability of even attempting to carry a line of contact lenses as a stock item will be manifest where they are formed by the prior art practice of molding a scleral rim of plastic material directly about a ground and polished glass corneal lens.

Another serious drawback inherent in the processing methods heretofore employed resides in the extremely high percentage of product spoilage. This spoilage may be attributed to the necessity of working with a ground and polished corneal lens of glass, which material is obviously of a fragile nature, throughout all of the many processing steps required to produce a contact lens.

Besides the provision, as a major object of my invention, of a process lacking the disadvantages inherent in practices heretofore employed to produce contact lenses, I aim to provide a process of such nature that intermediately of its completion and as a partially finished product it produces contact lens stock. Another object concerns the limitation of product spoilage in a process for producing a contact lens by employing a corneal insert of unbreakable material to form a lens seat in a scleral rim, a corneal lens of glass or other refractive material being mounted in the seat following the molding of the rim.

With these and other objects in view, which may be incident to my improvements, the invention consists in the process, to be hereinafter set forth and claimed, with the understanding that the several process steps which comprise my invention may be varied in sequence without departing from the spirit of the invention.

In order to make my invention more clearly understood, I have shown in the accompanying drawings, wherein similar parts are designated by like reference characters, means for carrying the same into practical effect without limiting the improvements in their useful applications to the particular forms and constructions which, for the purpose of explanation, have been made the subject of illustration. To this end, the invention is disclosed in the following manner, wherein:

Figure 1 is a vertical section through the molds used in carrying out my invention and shows their positions with respect to each other following the waxing of the master male mold of metal and the casting of the stone female mold.

Figure 2 is a vertical section through the female mold after its separation from the male mold following the formation of the scleral rim.

Figure 3 is a vertical section showing contact lens stock comprising a scleral rim and a corneal insert supported upon a secondary male mold of plaster which is mounted in apparatus for removing the corneal insert from the rim.

Figures 4, 5 and 6 are fragmentary vertical sections, similar to Figure 3, which illustrate respectively, a step in the removal of the corneal insert from the scleral rim, a corneal lens being placed in the scleral rim and a corneal lens in seated position in a scleral rim.

Figure 7 is a section through a completed contact lens.

Figure 8 is a sectional view showing a different form of lens stock.

Figure 9 shows a vertical section through a secondary male mold which supports lens stock of the type disclosed in Figure 8 and also shows, in partial section, a lens seating apparatus arranged in working position for placing a corneal lens in the lens stock.

Figure 10 is a sectional view on the line 10—10 of Figure 9.

One method heretofore employed for producing a contact lens involves molding a scleral rim of plastic about a ground and polished glass corneal lens. A master male mold having a curved portion which may be either of spherical or toric shape and a cooperating female mold, cast of dental stone, are used for this purpose. In molding, the glass corneal lens is held between the molds so that its geometrical center and that of the curved portion lie in the same vertical plane.

The molds are separated following molding, with the rough contact lens being retained in the female mold to allow the finishing of the back or interior surface thereof by shaping the joint between the scleral rim and the corneal lens and by polishing this surface. A secondary male mold of plaster is then formed, the rough contact lens is mounted thereon and the female mold is removed. Completion of the contact lens is effected by shaping the joint between the rim and the corneal lens at the front surface, by sizing the rim for width while cutting it so that the corneal lens will be decentered with respect thereto by the amount desired, by abrading the front surface to size the rim for thickness, by rounding off the edge of the rim and by polishing the front surface.

A general method such as that just outlined is detailed in connection with the molds and apparatus described in application Serial No. 248,832, filed Dec. 31, 1938, by A. F. Dittmer, and by Patent No. 2,225,040 issued December 17, 1940, to A. F. Dittmer. As pointed out, practice of this nature makes it impractical to produce contact lenses as a stock item and also this practice is carried out with unavoidable product spoilage. While my process may be effected, if desired, by molds and apparatus like those disclosed in the before mentioned application and patent, I am able to improve upon the prior art procedure by utilizing a novel processing technique which permits the scleral rim of a contact lens to be partially completed before a fragile corneal lens is mounted therein.

In attaining the aims and purposes of my invention, I make use of the fact that the corneal lens employed is generally of the concave-convex type and that only the convex face is corrected to meet the desired lens prescription. This fact permits the use of many different lenses, all of which are provided with a concave face of a standard curvature. Advantage is taken of this condition by forming a lens seat in a plastic scleral rim with the aid of a corneal insert having a concave surface which is substantially of the same size and curvature as the standardized concave surface provided on the glass corneal lens. As a result, the corneal lens is mounted in a partially finished scleral rim and is not handled in the processing steps until they are well advanced towards completion. In furtherance of this practice, I also employ the expedient of providing a standardized edge portion for all lenses as well as making the lenses of standardized diameter.

To the above ends, I make use of a master male mold, generally designated by the reference numeral 10. As shown in Figure 1, the male mold 10 is provided with a conical portion 11 and a curved portion 12 of toric or spherical shape which are coaxially aligned with each other. Curved portion 12 is provided at its top with a flat surface 13 whose geometrical center lies on the longitudinal axis of the mold 10. The top of the conical portion 11 is formed with a projection 13' which surorunds the base of the curved portion of the male mold and serves as a plastic lock for insuring proper pressure on the plastic used to form the scleral rim. A suitable indexing depression (not shown) is formed at one point on the projection 13'. The indexing depression together with the flat surface 13", formed on the side of the curved portion when it is cut from metal stock, provide the usual means for locating the meridians of the molded scleral rim in the latter stages of the process.

As the scleral rim of a contact lens is of a toric or spherical shape, the form of the curved portion 12 is dependent upon the particular scleral curve desired. The curved portion 12 and the flat surface 13 can be considered as the rim forming portion of the mold. In practice, a number of male molds of different desired curvature are made up so that any contact lens having a particular scleral curve within the range provided by the molds may be produced. Each mold is provided with a curved portion of a size to cause an overwidth scleral rim to be produced. The body of the male mold is turned or cut from suitable metal which is then plated with some hard metal such as nickel or chromium and the mold is polished.

In carrying out the molding operations, a sheet of wax 18 of the thickness desired for the corneal build up is placed upon the flat surface 13 of the rim forming portion of the male mold. Under the procedure employed by the prior art, a ground and polished glass corneal lens is mounted upon the wax forming the build up so that the longitudinal axis of the mold passes through the geometrical center of the lens. Instead of this practice, I make use of a corneal insert 14 having a concave surface of substantially the same curvature and diameter as the back or concave surface of a corneal lens to be employed with the completed product. The insert may be made of any material suitable for the formation of molds which will not be broken by the molding pressures employed in my process. For example, any metal such as steel, stainless steel, or brass may be employed. Also the insert may be formed of glass which will withstand the working pressures of the process. It is to be understood that the terms "corneal insert" and "insert" as used throughout the specification and claims refer to a member which is neither adapted nor intended to function as a lens.

The corneal insert is provided with an edge poriton or bevel 16 which consists of a concave or back part and a convex or front part. This edge portion is the same in size and shape as the edge portion or bevel provided on a glass lens having a back surface like that of the surface 15 and joins the latter to the body of the corneal insert. As may be noted, an extension 17, generally of cylindrical shape, is provided upon the body of the insert. This extension is very accurately formed to a suitable diameter and is carefully located so that its longitudinal axis passes through the geometrical center of the surface 15. Both the edge portion 16 and the surface 15 are accurate reproductions of the back surface and edge portion of a glass corneal lens to be seated on the scleral rim.

As already noted, I center the corneal insert on the wax 18 providing the corneal build up. This may be readily accomplished with the aid of any suitable apparatus for holding the metal mold 10 so that its longitudinal axis coincides with that of a movable tool, which tool detachably carries the corneal insert 14 in a position such that the longitudinal axis of the insert is also in coincidence with that of the mold. The purpose of the corneal build up is to locate the corneal lens for the finished product, and hence the surfaces of the insert corresponding thereto, in offset relation to the back surface of the scleral rim so that the lens will not contact the cornea of the eye. The surface 15 of the corneal insert, which is larger than the surface 13 of the male mold, will extend over the edge of the surface 13 when properly seated thereon and due to the wax will be located above the curved portion 12 of the mold, as viewed in Figure 1, to effect the desired build up from the curved portion.

The male or positive mold 10 with the corneal insert secured thereto is dipped in molten wax to form, as shown in Figure 1, a wax coat 19 on the rim forming surface of a thickness slightly greater than that desired for the finished scleral rim of the contact lens. Wax adhering to the extension 17 and the upper part of the body of the corneal insert 14 is cut away to leave the lower part of the body engaged by a lip 44' of wax. A layer of foil 20 is then placed over the rim forming portion of the mold, including the waxed part of the body of the corneal insert, and this foil is burnished down. These operations complete the positive for the casting of the negative or female mold. However, if desired, a suitable spring clamp may be placed over the mold 10 and engaged with the foil and the wax to assure the transfer of the foil to the interior of the female mold in the subsequent casting step of the process.

Casting of the female mold is accomplished with the use of a suitable form provided with a conical bore having a taper like that of the conical portion 11 of the male mold 10. The male mold is pressed into this bore as far as it will go, force being employed to assure a tight seating engagement, and the small end of the bore, which extends well beyond the end of the corneal insert, is filled with some type of cement such as dental stone. This dental stone forms an exact replica of the bore and the waxed and foiled positive to provide the female or negative mold 21. The combined male and female molds, following the casting of the latter and their removal from the tapered casting form, are shown in Figure 1.

Preparatory to molding the scleral rim, the wax layer indicated at 18, 19 and 44' between the molds is boiled out by heating the molds to the melting temperature of the wax, the molds are separated and any wax remaining therein is cleaned away. On separation of the molds 10 and 21, the bond between the metal insert, foil 20 and the dental stone of the female mold is sufficient to retain the insert and the foil in the latter, the insert being firmly embedded in the cement.

Any suitable plastic material may be used to form the scleral rim, compression molding methods generally being utilized for this purpose although the rim may be formed by injection molding. The material, in its molded form, should possess a suitable color and the ability to retain this color with reasonable aging, it should also be able to withstand the effects of temperatures encountered in the course of wear as well as being of such nature that it will not irritate the eye of a wearer.

Aside from the properties just noted, the plastic, in its molded form, should be of a highly elastic or rubbery character when heated below its vulcanization temperature so as to permit it to be deformed by the application of physical force. In addition, the molded plastic should be of a nature which may be set or held in its deformed condition by suddenly chilling the heated rim, as for example in cold water. Also the plastic should have the ability when reheated below vulcanization temperature to be released from its set and, due to its elastic character, to be returned to its original molded shape. These just mentioned properties of the plastic are utilized in removing the corneal insert and in mounting a finished corneal lens in the scleral rim.

A number of thermoplastic resins possessing the characteristics needed for rim forming material are well known to the art. Also the art is well cognizant of the thermosetting resins which will possess the properties just enumerated when these resins are incompletely polymerized by vulcanization at temperatures and for time periods, familiar to skilled workers, which are insufficient to completely cure the resin and render it infusible.

Any suitable thermosetting plastic may be employed. Many of the phenol formaldehyde resins are adapted to this purpose. Examples of these may be found in the phenol formaldehyde resins manufactured by the Bakelite Corporation under the identification numbers of XR-10247, XR-11328 and XR-14296. Extremely satisfactory results have been obtained with the resin just noted as XR-14296, when press molded under the usual operating pressures and when cured for approximately 1 hour and 15 minutes at a temperature of substantially 266° F.

By way of illustration of thermoplastic material, I have successfully used a resin of this nature known under the trade-mark of "Crystolex." Thermoplastic materials, however, are usually soluble in most disinfectants employed to sterilize a contact lens prior to its insertion in the eye. For this reason thermosetting plastics, which are in general resistant to chemical attack, are preferred.

The molding operation is carried out in the usual manner with the aid of any well known apparatus. In brief, the male and female molds are heated to bring them to the temperature needed to work the plastic, after which the cavity of the female mold is filled with powdered plastic and the molds are brought together under proper pressure. The molds are maintained under suitable molding pressure and at vulcanization temperature for a time sufficient to set or cure the plastic. As a result of this operation, a plastic scleral rim is produced which is substantially of the same size and shape as the wax filling material 18, 19 and 44' shown between the molds in Figure 1 and quite obviously replaces it. The rim thus formed is relatively thin having a thickness which varies from about 0.025 inch at its edge to about 0.040 inch where it surrounds the corneal insert. About 0.010 of an inch is ground away from the entire rough rim in sizing it for thickness.

Advantages of my improvements will now become apparent. For example, lens breakage due to pressure between the molds in the molding step is eliminated by the use of a corneal insert. Also where a glass lens is employed, the bond between it and the foil and the female mold is limited. This results in frequent product spoilage due to displacement of the lens from its proper position with respect to the molds by the plastic. On the other hand, the corneal insert is substantially unmovable in the female mold. It is to be noted that where a rim is molded about a fragile lens, neither of these causes of product spoilage will appear until the process is in a well advanced stage.

The next steps in my process are concerned with finishing the back concave surface or interior of the molded scleral rim. As may be observed from Figure 1, the central portion of the molded scleral rim, corresponding to the wax filling 18, will extend in back of the surface 15 of the metal insert 14. Not only must an opening be provided through the rim at this section for a corneal lens but also it is necessary to shape the joint which will exist between the back of the scleral rim and the lens itself.

In furtherance of the just mentioned steps, the molds are separated and the female mold with the rim retained therein, is mounted upon a device designed to cut away the plastic in back of the insert and shape the interior joint for the corneal lens. This is essential as the molding process produces an unbroken rim which lacks a central lens opening. Usual apparatus for this purpose employs a fixed mold holding chuck which is centered with respect to a rotatable tool holding spindle. The mold is mounted on the chuck in centered relation thereto. Through the aid of one or more rotated tools, a circular cut is made through the central portion of the rim to the back surface 15 of the insert. By means of the circular cut just mentioned the plastic in back of the surface 15 of the insert, formed as a result of providing the wax corneal build up, is separated from the remainder of the rim and may be removed so as to provide the central lens opening which is surrounded by a rim seat. The joint 23 on the back surface of the rim 22 is formed and shaped by cutting the edge of the opening for the corneal lens back to the beginning of the concave part of the edge portion 16 of the insert.

The interior or concave surface of the scleral rim is now completed by rounding off the cut surfaces with an abrading tool after which a polishing tool and suitable abrasive are employed to polish the entire concave surface of the scleral rim. In Figure 2 there is shown a female mold 21 containing a molded plastic scleral rim 22 which has had its interior finished in the manner just described.

Preliminary to placing the corneal lens in the plastic rim and also shaping the front joint, it is necessary to mount the rim and insert upon a second male mold. To this end a secondary male mold is cast of plaster by making use of an internally tapered form like that already described. The stone female mold 21 with the plastic rim 22 is placed within such a form which is then filled with suitable plaster to provide the secondary male mold 24 shown in Figure 3. When the plaster has hardened, the female mold and the secondary mold 24 are withdrawn from the form and the molds are separated by breaking or cutting away the stone female mold. This leaves the plaster male mold 24 with the plastic rim 22, which carries the insert 14, supported thereon in the manner illustrated in Figure 3.

At this stage of the process I have produced a molded scleral rim which has a completed concave or back surface and which is provided with a corneal insert which is seated in the rim. This structure provides a form of contact lens stock comprising a partially processed but preformed rim which may be stored for an indefinite period and completed when desired in the manner to be just hereinafter described. Instead of this practice, however, stock of the form having the corneal insert removed and consisting only of the partially completed scleral rim, may be provided by following another type of procedure which will be later explained in detail. The second type of procedure possesses the advantage of limiting the number of inserts which must be kept on hand to supply the normal demand for lenses since it frees each insert employed for substantially immediate reuse by obviating the necessity of storing it with its rim.

Obviously, since the diameter and curvature of the concave surface of the corneal insert are constants for rims made in this manner, it will be apparent that any number of rims, which may or may not have a seated insert and which may be provided with different scleral curves, may be produced for stock purposes. For convenience, the lens stock of either type is usually supported upon its cooperating plaster mold during storage. As such a mold is employed in later process steps, this practice avoids duplication of procedure by eliminating the necessity of forming a second plaster mold. It should be noted that my process may be arrested following the formation of either type of lens stock and may be resumed to provide completed lenses from stock which has been stored for indefinite periods.

Where lens stock of the type having the corneal insert retained in the rim is to be converted into a completed contact lens, it is necessary to remove the insert and seat the corneal lens of ground and polished glass or other refractive material within the rim. To this end, use is made of means for holding the secondary male mold 24 and its supported rim as well as means for extracting the insert. One form of such apparatus is disclosed in Figure 3, with the plaster mold and its supported rim mounted therein, although it is to be understood that my process is not limited to the use of this particular device.

As illustrated, the holder comprises a tubular body 25 having a closure 26 provided with an opening and a threaded closure 27, which latter is detachably connected to the body. The threaded portion 27 is formed with an internally threaded hub 28 which engages a pressure screw 29 adapted to extend within the body 25 to permit positioning of pressure plate 30 located within the holder. Pressure plate 30 is suitably connected to the screw 29 to allow rotation of the latter without causing the rotation of the plate 30. On the other end of the pressure screw 29 there is provided a suitable operating handle, not shown in the drawings.

In operation, mold 24 with its corresponding scleral rim supported thereon is inserted within the holder so that the corneal insert of the rim extends through the opening in the closure 26, the pressure plate 30 is placed within the holder and the detachable closure 27 is secured to the body 25. The pressure screw is then turned to hold the mold and its rim in firm bearing contact with the plate 30 and the opening in the closure 26 to assure the fixed positioning of the mold. The diameter of the holder is slightly greater than the maximum diameter of the conical part of the mold 24 to permit insertion of the latter in the holder.

Extracting apparatus associated with the holder comprises a pulling head 31 having a bore partially extending within its body which is adapted to engage the extension 17 of the corneal insert 14 in the manner disclosed in Figure 3. Set screw 32 in the pulling head provides means for securing the latter to the insert. The pulling head 31 has a yoke 33 which carries pins or trunnions 35 between which there is swivelled a nut or threaded shaft mount 34. A similar, but unthreaded, shaft mount or bearing member 36 is swivelled upon pins 37 carried by the arms of a yoke bracket 38 which is secured to the body 25 of the holder by fastening members 39.

Extending through both mounts 34 and 36 is a shaft or rod 40 provided with threads 41 which engage the threads of the nut 34. A suitable knob 42 is provided on one end of the shaft 40 for rotating the same. Collars 43 are secured to the shaft 40 on each side of the bearing 36 to prevent longitudinal movement of the shaft relative to its support members 34 and 36 when it is rotated. It is to be noted that the longitudinal axis of the pulling rod 40 is angularly inclined with respect to the vertical, that is to say, its mounts 34 and 36 are located at unequal distances above the closure 27 of the holder for the contact lens stock.

The operation of the extracting device may be best understood in connection with the process steps wherein the glass corneal lens is mounted on the seat formed by the metal insert. To carry this out the plastic rim is heated to a temperature slightly below the vulcanizing temperature of the plastic for a time sufficient to bring the rim to a condition where it may be forcibly deformed. Heating may be effected by immersing the rim in boiling water or other suitable means. The holder has been designed to facilitate these operations and for this purpose the contact lens stock is secured therein, the pressure screw 29 serving as a handle for holding the device during the extraction of the corneal insert 14.

When the plastic has been properly heated, puller shaft 40 is turned in the desired direction to partially extract the corneal insert 14. As is evident from Figure 3, actuation of the puller shaft in this manner will cause the insert 14 to be tilted in a clockwise direction about its edge. This elevates the left portion of the concave surface 15 and bevel 16 with the right portion of the insert being fulcrumed on the back surface of the lens seat in the plastic rim 22.

Force applied to the insert will cause no harmful distortion of the right hand portion of the rim since such force is working against the relatively rigid body of the plaster mold. However, the left portion of the lip 44 on the front surface of the rim will be pushed or turned back and the front edge of the central seat opening in the rim expanded. This condition is illustrated in Figure 4 which shows the position occupied by the insert 14 at this stage of extraction as well as the turned back position of the lip 44 shown on the left side of this figure, there being substantially no deformation of the lip at a location diametrically opposite thereto on the right.

The lip 44 in its turned back position is now set in this condition by suddenly chilling it with cold water or other cooling means. A simple manner of carrying this out is to immerse the holder and the lens stock in cold water. This leaves the rim held or set in the position shown in Figure 4. To complete the removal of the insert, a portion 45 of the turned back lip 44 is cutaway, by means of a suitable tool, for about half the distance around the seat opening. This frees the portion of the insert on the left in Figure 4 and permits the insert to be slid to the left and out of the lens seat.

A finished corneal lens 46 whose concave surface and edge portion are of the same dimensions and shape as those features of insert 14, is now mounted in the scleral rim by sliding a portion of its edge into the right portion of the rim seat vacated by the insert 14. This is illustrated in Figure 5, wherein lens 46 is shown with its right edge inserted in the rim seat and its left edge just engaged with the turned back lip. Following this, the lens 46 is pushed downwardly until its concave surface is in firm contact with the male plaster mold 24. When lens 46 has been pushed downwardly, it is in frictional engagement with the rim, although a portion of the lip 44 has been removed, so that the lens will be retained in seated position for the next processing operation.

The lens 46 is permanently held in its seated position by again heating the scleral rim, in a manner such as described, to a temperature somewhat below that used in vulcanization. This releases the rim from its deformation set and permits the deformed portion of the lip 44 to return to its molded shape. As a result, the entire bevel formed in the rim seat will be in firm bearing contact with the edge portion of the lens. This condition is illustrated in Figure 6.

As I have indicated, my invention also contemplates the completion of a contact lens to a stage where the corneal lens has been seated in the scleral rim by the processing of a type of lens stock which is different from that illustrated in Figure 3. In that just mentioned figure, lens stock designated by the character $S_1$ and comprising a partially completed scleral rim 22 having a corneal insert 14 seated therein is shown supported upon the plaster male mold 24. This second type of lens stock may be prepared from the stock $S_1$ by removing the corneal insert from the rim. Stock of this nature is indicated by the character $S_2$ in Figure 8 as comprising merely a scleral rim 22 having a completed concave surface, it being noted that none of the lip 44 has been cut away. The rim of Figure 8 has the usual central opening surrounded by a seat for the corneal lens.

One manner of preparing lens stock $S_2$ from a scleral rim having an insert mounted therein utilizes the holder and extracting apparatus of Figure 3, procedure similar to that already described being followed to remove the insert. However, after suitable heating of the rim, the extracting apparatus is actuated to pull the insert entirely out of its seat rather than to cause its partial removal. During extraction, the rim is of course deformed but the elastic nature of its material will cause the rim to immediately regain its molded shape when the insert has been completely removed.

While lens stock $S_2$ may be stored until it is desired to process it further and possesses the advantage that it immediately frees a corneal insert for reuse in the molding of additional rims, it will be apparent that some means must be provided for seating a corneal lens in stock of this nature. For this purpose, use may be made of the lens seating apparatus disclosed in Figure 9. This device has a plate member 48 provided with a central bore which is suitably threaded. Extending through this bore is a threaded shaft 49 provided on one end with an operating knob and on the other with a lens block 50 which is formed of suitable material and which is adapted to engage the corneal lens in the seating of the latter in the rim. For this reason block 50 has a concave cavity which is of stronger curvature and smaller diameter than any corneal lens expected to be used with a rim so as to contact the lens in the manner shown. Lens block 50 and shaft 49 are connected by any conventional swivel coupling so that the block may be held from rotating with the shaft.

The remaining element of the lens seating device comprises an elongated barrel member 51 of resilient sheet metal or other material which is rolled in a spiral to have its ends overlap as shown at 52 in Figure 10. One end of the barrel member 51 is soldered or otherwise secured to the underside of plate member 48 as in Figure 9 so that the longitudinal axis of the barrel coincides with that of the screw 49. Overlapping sides 52 are left free and are not fastened together or to any element of the apparatus except as may be incidental to the securing of the barrel 51 to the plate 48.

In this way the barrel is afforded a substantially constant cross section adjacent its secured end. This construction, however, provides a barrel of cylindrical like shape which may be deformed by pressure into a shape approximating a cone. Due to the nature of the material used for the barrel member, it will be well understood that on release of such pressure the barrel will tend to return to its original rolled shape. Normally the interior of the barrel approximates a cylinder whose diameter is substantially equal to that of the corneal lenses previously described so that any such lens may be frictionally gripped in a sliding fit by the barrel.

Preparatory to placing a corneal lens in stock S₂, the particular lens to be employed is inserted within the barrel member 51 until its convex surface engages the lens block, the lens being positioned as shown in Figure 9 so that its optical axis is roughly perpendicular to the transverse axis of the barrel. The lens block 50 is well retracted towards the plate 48 when a lens is inserted. By way of further preparation for this operation, the mold 24 is supported on a flat working surface, the stock S₂, which has been heated, being mounted upon the mold.

To place lens 46 in its seat, the free end of the barrel is pinched or compressed by hand or other suitable means to a diameter somewhat less than that in the opening in the rim of the stock S₂ to give the barrel member a conical like shape. The lens seating device is now mounted in its operative position by inserting the free end of the compressed barrel member into the central opening until it contacts the plaster mold after which the pressure applied to deform the barrel is released so that the barrel contacts the interior of the lens opening in the stock S₂. However, the barrel member will still retain a conical like shape due to the difference in diameter between the barrel member at its fixed end and the lens opening adjacent the surfaces of the rim.

With the lens seating apparatus firmly held in operating position, for example by hand, screw 49 is rotated to move the lens block 50 and lens 46 towards mold 24. As this occurs, the portion of the barrel member between the lens and the mold is expanded until the entire barrel again assumes a cylindrical like shape. This expansion causes lip 44 to be pushed back to the position shown in Figure 9 and to give the rim opening a diameter substantially equal to that of the corneal lens 46 so that the latter may be seated in the rim upon further actuation of the screw 49. Still further inward movement of the screw towards the mold 24 causes outward movement of the barrel 51 relative to the lens and lens block 50 since these latter elements are prevented from inward movement due to the contact of the lens with its seat and with the mold. If the rotation of the screw is continued as just described, the barrel 51 will be removed or extracted from the scleral rim. Quite obviously the lip 44 will then return to its molded shape and the lens 46 will be engaged in its seat.

Irrespective of the practice followed to place a corneal lens in a stock scleral rim, one general form of procedure is used to complete the contact lens. This procedure includes shaping the front joint between the scleral rim and the lens to its final rough form. In illustration, one manner of shaping front joint 47 cuts away the portion of the rim adjacent the lens to the beginning of the convex part of the lens bevel with one or more appropriate tools to provide a joint such as shown in Figure 7. A tool is rotated about an axis which coincides with the axis of the male mold while the latter with the rim supported thereon is fixedly held in a chuck or other holder.

The scleral rim as formed in the molding operation is oversize in width. Also the corneal lens is centered on the rim. The final major step towards completing the contact lens comprises cutting the scleral rim to the desired width at the proper angle to produce the desired degree of decentration for the corneal lens. This may be effected by holding the male mold 24 so that its longitudinal axis is inclined to the vertical by an angle sufficient to produce the desired degree of decentration while cutting the rim along a horizontal plane located so as to produce the desired rim width. Figure 7 illustrates, in cross section, a contact lens which has been cut for rim width and lens decentration. It may be observed that the left portion of the cross section of the rim shown in Figure 7 is shorter or of less width than the right portion.

But few steps now remain to complete the contact lens. These relate to finishing the front surface of the rim and rounding off the cut edge of the rim produced when sizing it. To assist in these operations, use is generally made of a holding cap (not shown in the drawings) which is centered on the front surface of the corneal lens and waxed thereto. The nearly completed contact lens is readily removable from the plaster male mold and may be held by the attached cap during the operations just noted above.

The front surface of the scleral rim is finished with the use of suitable abrading tools. These are employed to round off the joint 47 between the rim and the convex surface of the glass lens and also to round off the edge of the rim formed in bringing the oversized rim to proper width. As the rim has been made slightly oversize in thickness, the front surface of the rim is ground away until the desired rim thickness is reached. With the aid of a suitable abrasive slurry and polishing wheel, the contact lens is completed by polishing the front surface of the scleral rim.

It will be well understood that my invention is not limited to use with a corneal insert of the particular type disclosed but may be carried into practical effect with inserts whose controlling features vary considerably therefrom in size and shape. While I have shown a corneal lens having a convex front surface, it will be apparent that the invention is susceptible of practice when using a front surface of any other type as obviously the shape and curvature of the front surface of the corneal lens will have no effect in the molding of the scleral rim and the formation of the lens seat.

From the foregoing, it will be appreciated that any lens having a back surface and an edge portion corresponding to the dimensions of a corneal insert may be mounted in a scleral rim molded with the aid of such insert. This practice permits the attainment of one of the objects of my invention since it greatly increases the efficiency of a process for producing contact lenses by substantially eliminating product spoilage. Of extreme importance is the fact that this procedure makes it possible to provide contact lens stock from which prescriptions can readily be filled, with vast savings in time, by carrying out the few simple steps remaining to complete the contact lens.

I claim:

1. In a process for producing a contact lens having a corneal lens of transparent refractive material mounted in a seat in a plastic scleral rim which has an opening surrounding said seat, the steps of holding a corneal insert, of the character having a back surface and a bevelled edge portion substantially similar in dimensions and shape to the respective back surface and bevelled edge portion of the corneal lens used in the finished contact lens, in a position wherein the edge portion of the insert will be offset from the back surface of the molded rim by a predetermined amount, said edge portion of the insert shaping the seat in said rim for said lens, molding the rim about the insert while holding the insert in said position, heating said rim, turning back a part of the edge of said opening in said rim by partially withdrawing said insert from its seat, chilling the rim to maintain the edge of said opening in its turned back condition, cutting away a part of the turned back portion of the edge of the rim, removing said insert, mounting the corneal lens in said seat and then reheating said rim to return said turned back portion to its normal position.

2. In a process for producing a contact lens having a corneal lens of transparent refractive material mounted in a plastic transparent scleral rim, the steps of forming the rim by molding a plastic material about the edge portion and back surface of a corneal insert of rigid material while holding said insert in a predetermined position wherein the edge portion and the back surface of said insert will be located in predetermined offset relation to the back surface of the molded rim, forming an aperture in the rear surface of said rim opening onto the back surface of said insert, removing said insert from the molded rim, and mounting the edge portion of a corneal lens having its edge portion and back surface substantially equal in dimensions and shape to the edge portion and back surface of said insert in the seat formed in the rim by the edge portion of said insert.

3. In a process for producing a contact lens having a corneal lens of transparent refractive material mounted in a plastic scleral rim, the steps which comprise forming the rim by molding a plastic material about the edge portion and back surface of a corneal insert while holding said insert in a position wherein the edge portion of the same will be offset from the back surface of the molded rim by a predetermined amount, forming an aperture in said rim opening onto the back surface of said insert, forcibly deforming the rim by upsetting the same adjacent the front surface of said insert, removing said insert from said rim, mounting a corneal lens having an edge portion and back surface substantially equal in dimensions and shape to the edge portion and back surface of said insert in said aperture with the edge portion thereof in the seat formed by the edge portion of said insert while maintaining the rim in its deformed condition, releasing said rim from said deformed condition to fix the edge portion of said lens in said seat so that the back surface of said lens occupies a position substantially coincident with the position occupied by the back surface of said insert relative to said rim during said molding step, and removing a portion of the front surface of said rim contiguous to said lens to render the said contiguous surface substantially flush with the front surface of said lens.

4. In a process for producing a contact lens of the type having a corneal lens of transparent refractive material mounted in a scleral rim, the steps of forming said rim by molding a plastic material about an edge portion and back surface of a corneal insert of rigid material, forming an aperture in said rim opening onto the back surface of said insert, forcibly deforming said rim adjacent the front surface of said insert, removing said insert, and mounting a corneal lens having an edge portion and back surface substantially equal in dimensions and shape to the respective back surface and edge portion of said insert in the seat formed by the edge portion of said insert while maintaining the rim in its deformed position, and releasing said rim from its deformed position to fix said lens in said seat so that the back surface of said lens occupies a position substantially coincident with the position occupied by the back surface of said insert relative to said rim during said molding step.

5. In a process for producing a contact lens of the type having a corneal lens of transparent refractive material mounted in a scleral rim, the steps of forming said rim by molding a plastic material about the edge portion and back surface of a rigid corneal insert, forming an aperture in said rim opening onto the back surface of said insert, heating said rim, forcibly deforming said rim by partially withdrawing said insert from the seat formed by the edge portion thereof, maintaining the rim in its deformed position while cutting away a portion of the front surface thereof surrounding said aperture, removing said insert, and mounting a corneal lens having an edge portion and back surface substantially equal in dimensions and shape to the respective edge portion and back surface of said insert in said seat while maintaining the rim in its deformed position, and releasing said rim from said deformed position to cause the same to fix the edge portion of said lens in said seat so that the back surface of said lens occupies a position substantially coincident with the position occupied by the back surface of said insert relative to said rim during said molding step.

6. In a process for producing a contact lens of the type having a corneal lens of transparent refractive material mounted in a scleral rim, the steps of forming said rim by molding a plastic material about the edge portion and back surface of a rigid corneal insert while holding said insert in a position wherein the edge portion and back surface thereof are located in predetermined offset relation to the back surface of the molded rim, forming an aperture in said rim opening onto the back surface of said insert, removing said insert from said rim, forcibly deforming the edge of said aperture to expand the same to a diameter substantially equal to that of the seat formed by the edge portion of said insert, seating the edge portion of a corneal lens having an edge portion and back surface substantially equal in dimensions and shape to the edge portion and back surface of said insert in said seat while maintaining the edge of the aperture in said deformed position, and releasing said deformed edge of the rim to fix the edge portion of said lens in said seat so that the back surface of said lens occupies a position substantially coincident with the position occupied by the back surface of said insert relative to said rim during said molding step.

7. In a process for producing contact lens stock, the steps of forming a scleral rim by molding a plastic material about the edge portion and back surface of a corneal insert of rigid material while holding said insert in a predetermined position wherein the edge portion and the back surface of said insert will be located in predetermined offset relation to the back surface of the molded rim, and forming an aperture in the rear surface of said rim opening onto the back surface of said insert whereby said insert may be subsequently removed for replacement by a corneal lens having an edge portion and back surface of substantially the same dimensions and shape as the edge portion and back surface of said insert.

8. In a process for producing contact lens stock, the steps of forming a scleral rim by molding a plastic material about the edge portion and back surface of a corneal insert of rigid material while holding said insert in a predetermined position wherein the edge portion and the back surface of said insert will be located in predetermined offset relation to the back surface of the molded rim, forming an aperture in the rear surface of said rim opening onto the back surface of said insert, and molding a support for said rim by filling the same with a moldable material which when set will form a rigid support engaging substantially the entire rear surface of said rim.

GILBERT J. SHELDON.